US 8,230,240 B2
Jul. 24, 2012

(12) United States Patent
Diab et al.

(54) METHOD AND SYSTEM FOR ENERGY EFFICIENT NETWORKING OVER A SERIAL COMMUNICATION CHANNEL BASED ON FORWARD ERROR CORRECTION SUPPORT

(75) Inventors: Wael William Diab, San Francisco, CA (US); Velu Pillai, Austin, TX (US)

(73) Assignee: Broadcom Corporation, Irvine, CA (US)

( * ) Notice: Subject to any disclaimer, the term of this patent is extended or adjusted under 35 U.S.C. 154(b) by 452 days.

(21) Appl. No.: 12/495,530

(22) Filed: Jun. 30, 2009

(65) Prior Publication Data

US 2010/0262844 A1    Oct. 14, 2010

Related U.S. Application Data

(60) Provisional application No. 61/167,769, filed on Apr. 8, 2009.

(51) Int. Cl.
*G06F 1/00* (2006.01)

(52) U.S. Cl. ........................................................ 713/300

(58) Field of Classification Search .................... 713/300
See application file for complete search history.

(56) References Cited

U.S. PATENT DOCUMENTS

| | | | |
|---|---|---|---|
| 6,738,394 B1 * | 5/2004 | Kreuzgruber et al. | ........ 370/514 |
| 6,795,450 B1 | 9/2004 | Mills et al. | |
| 7,050,517 B1 | 5/2006 | Sallaway et al. | |
| 7,308,058 B2 | 12/2007 | Zerbe et al. | |
| 2003/0226050 A1 | 12/2003 | Yik et al. | |
| 2005/0188232 A1 | 8/2005 | Weng et al. | |
| 2006/0034295 A1 | 2/2006 | Cherukuri et al. | |
| 2007/0280239 A1 | 12/2007 | Lund | |
| 2008/0225841 A1 | 9/2008 | Conway et al. | |
| 2009/0180529 A1 | 7/2009 | Agazzi et al. | |
| 2010/0097969 A1 * | 4/2010 | De Kimpe et al. | ............. 370/311 |
| 2010/0128738 A1 | 5/2010 | Barrass | |
| 2010/0141762 A1 * | 6/2010 | Siann et al. | ................... 348/143 |
| 2010/0241880 A1 | 9/2010 | Wertheimer et al. | |
| 2010/0262848 A1 | 10/2010 | Bobrek et al. | |

FOREIGN PATENT DOCUMENTS

EP             1 473 870          11/2004

(Continued)

OTHER PUBLICATIONS

Grow, "802.1 and Energy Efficient Ethernet." Sep. 11, 2007, pp. 1-6, XP002509616.

(Continued)

*Primary Examiner* — Mohammed Rehman
(74) *Attorney, Agent, or Firm* — Duane S. Kobayashi (57) ABSTRACT

Aspects of a method and system for energy efficient networking over a serial communication channel are provided. In this regard, one or more circuits in an Ethernet PHY that communicates over one or more serial communication channels may transmit and/or receive physical layer signals to maintain and/or refresh synchronization and/or training parameters while operating in an energy saving mode. The Ethernet PHY may transition out of the energy saving mode upon transmitting and/or receiving a wake sequence via the serial communication channel(s), where the wake sequence comprises one or more deterministic forward error correction (FEC) block in instances that FEC is utilized for communications via the serial communication channel(s). The one or more circuits in the Ethernet PHY may be operable to perform forward error correction (FEC) functions and one or more of the FEC functions may be disabled while remaining ones of the FEC functions are enabled.

21 Claims, 7 Drawing Sheets

FOREIGN PATENT DOCUMENTS

| | | |
|---|---|---|
| EP | 1 484 876 | 12/2004 |
| EP | 1 494 407 | 1/2005 |
| GB | 2 337 672 | 11/1999 |
| WO | WO 00/31923 | 6/2000 |

OTHER PUBLICATIONS

Teener, "AudioNideo Bridging for Home Networks (IEEE 802.1 AV Bridging Task Group)" [Online] Jun. 1, 2007, http://www.ieee802.org/3/eee_study/public/jul07/teener_1_0707.pdf.

Bennett et al., "Energy Efficient Ethernet." Jul. 16, 2007, pp. 1-70, XP002509615.

Gupta et al., "Dynamic Ethernet Link Shutdown for Energy Conservation on Ethernet Links." XP-002524616, pp. 6156-6161.

Wael Diab, "Energy Efficient Ethernet and 802.1." IEEE 802 Plenary, Nov. 16, 2007, XP-002524617.

* cited by examiner

METHOD AND SYSTEM FOR ENERGY EFFICIENT NETWORKING OVER A SERIAL COMMUNICATION CHANNEL BASED ON FORWARD ERROR CORRECTION SUPPORT

CROSS-REFERENCE TO RELATED APPLICATIONS/INCORPORATION BY REFERENCE

This patent application makes reference to, claims priority to and claims benefit from U.S. Provisional Patent Application Ser. No. 61/167,769 filed on Apr. 8, 2009.

The above stated application is hereby incorporated herein by reference in its entirety.

FIELD OF THE INVENTION

Certain embodiments of the invention relate to networking. More specifically, certain embodiments of the invention relate to a method and system for energy efficient networking over a serial communication channel.

BACKGROUND OF THE INVENTION

Communications networks and in particular Ethernet networks, are becoming an increasingly popular means of exchanging data of various types and sizes for a variety of applications. In this regard, Ethernet networks are increasingly being utilized to carry voice, data, and multimedia traffic. Accordingly more and more devices are being equipped to interface to Ethernet networks. Broadband connectivity including internet, cable, phone and VOIP offered by service providers has led to increased traffic and more recently, migration to Ethernet networking. Much of the demand for Ethernet connectivity is driven by a shift to electronic lifestyles involving desktop computers, laptop computers, and various handheld devices such as smart phones and PDA's. Applications such as search engines, reservation systems and video on demand that may be offered at all hours of a day and seven days a week, have become increasingly popular.

These developments have led to increased demand on datacenters, aggregation, high performance computing (HPC) and core networking. As the number of devices connected to data networks increases and higher data rates are required, there is a growing need for new transmission technologies which enable higher data rates. Conventionally, however, increased data rates often results in significant increases in power consumption. In this regard, as an increasing number of portable and/or handheld devices are enabled for Ethernet communications, battery life may be a concern when communicating over Ethernet networks. Accordingly, ways of reducing power consumption when communicating over Ethernet networks may be needed.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for energy efficient networking over a serial communication channel, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for energy efficient networking over a serial communication channel. In various embodiments of the invention, one or more circuits in an Ethernet PHY that communicates over one or more serial communication channels may transmit and/or receive physical layer signals over the serial communication channel(s) to maintain and/or refresh synchronization and/or training parameters while operating in an energy saving mode. The Ethernet PHY may transition out of the energy saving mode upon transmitting and/or receiving a wake sequence via the one or more serial communication channels, where the wake sequence comprises one or more deterministic forward error correction (FEC) block in instances that FEC is utilized for communications via the serial communication channel(s). The one or more circuits in the Ethernet PHY may be operable to perform forward error correction (FEC) functions and one or more of the FEC functions may be disabled while remaining ones of the FEC functions are enabled. One or more deterministic FEC blocks may be processed via the enabled remaining ones of the FEC functions. Synchronization may be maintained and/or refreshed based on the processing of the deterministic FEC blocks. The one or more circuits may be configured based on an energy efficient networking control policy. The energy saving mode may comprise a low power idle mode. One or more FEC functions may be disabled upon receiving a sleep signal from a link partner that communicates with the Ethernet PHY. One or more FEC functions may be enabled upon receiving a wake sequence. The serial communication channel(s) may comprise backplane, inter-chip connections, or copper cabling. One or more deterministic FEC blocks may be communicated while the Ethernet PHY is operating in a low power idle mode. FEC functions that may be disabled may comprise one or both of encoding and decoding functions, and/or one or both of scrambling and unscrambling functions. The Ethernet PHY may be integrated on a line card.

Figure 1A:
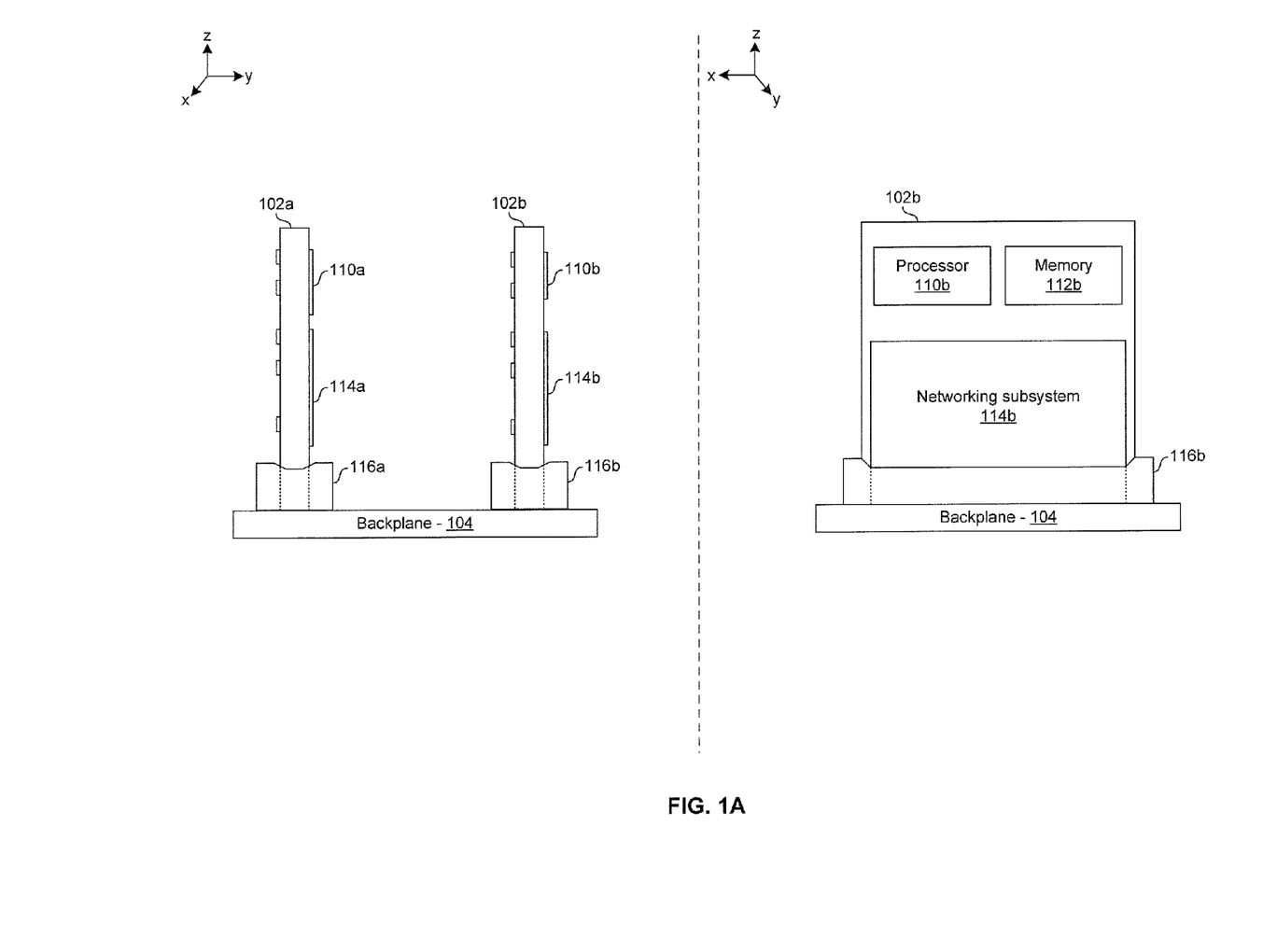
FIG. 1A is a block diagram depicting a pair of networking devices operable to implement energy efficient techniques for communicating over a backplane, in accordance with an embodiment of the invention.

FIG. 1A is a block diagram depicting a pair of networking devices operable to implement energy efficient techniques for communicating over a backplane, in accordance with an embodiment of the invention. Referring to FIG. 1A there is shown two views of network devices 102a and 102b communicatively coupled via a backplane 104. The network devices 102a and 102b are mounted to the backplane 104 via the connectors 116a and 116b, respectively, and may communicate over one or more serial links within or on the backplane 104. The backplane 104 may comprise, for example, a printed circuit board. The network device 102a may comprise a processor 110a, a memory 112a, and a networking subsystem 114a. Similarly the network device 102b may comprise a processor 110b, a memory 112b, and a networking subsystem 114b.

The network devices 102a and/or 102b may comprise line cards which may implement, for example, switching functions, routing functions, server functions, computing functions, or a combination thereof. Additionally, the network devices 102a and 102b may be enabled to utilize Audio/Video Bridging and/or Audio/video bridging extensions (collectively referred to herein as audio video bridging or AVB) for the exchange of multimedia content and associated control and/or auxiliary data. Also, the network devices may be operable to implement security protocols such IPsec and/or MAC-Sec.

In various embodiments of the invention, the network devices 102a and 102b may be operable to implement one or more energy efficient techniques, which may be referred to as energy efficient networking (EEN), or in the specific case of Ethernet, energy efficient Ethernet (EEE). In this regard, various portions of the network devices 102a and 102b may be configurable to implement the EEN techniques. For example, the network devices 102a and 102b may be operable to support low power idle (LPI) and/or subset PHY, also referred to as sub-rating, techniques. LPI may generally refer a family of techniques where, instead of transmitting conventional IDLE symbols during periods of inactivity, the network devices 102a and 102b may remain silent and/or communicate signals other than conventional IDLE symbols. Sub-rating, or sub-set PHY, may generally refer to a family of techniques where the PHYs are reconfigurable, in real-time or near real-time, to communicate at different data rates.

The processors 110a and 110b may each comprise suitable logic, circuitry, interfaces, and/or code that may be operable to process data and/or control operations of the network devices 102a and 102b, respectively. With regard to processing data, the processors 110a and 110b may enable packetization, de-packetization, transcoding, reformatting, and/or otherwise processing data received from and/or to be transmitted by the networking subsystems 114a and 114b. With regard to controlling operations of the network devices 102a and 102b, the processors 110a and 110b may be enabled to provide control signals to the various other portions of the network device 102a and 102b, respectively. In this regard, the processors 110a and 110b may be operable to make decisions and/or generate signals for configuring the networking subsystems 114a and 114b to implement EEN techniques. The processors 110a and 110b may also control data transfers between various portions of the network devices 102a and 102b, respectively. The processor 202 may enable execution of applications programs and/or code. In this regard, the applications, programs, and/or code may enable, for example, parsing, transcoding, or otherwise processing data. Furthermore, the applications, programs, and/or code may enable, for example, configuring or controlling operation of the networking subsystem 114a and 114b, and/or the memories 112a and 112b.

The memories 112a and 112b may comprise suitable logic, circuitry, and/or code that may enable storage or programming of information that includes parameters and/or code that may effectuate the operation of the network devices 102a and 102b, respectively. The parameters may comprise configuration data and the code may comprise operational code such as software and/or firmware and the parameters may include adaptive filter and/or block coefficients, but the information need not be limited in this regard. Additionally, the memories 102a and 102b may buffer or otherwise store received data and/or data to be transmitted. In various embodiments of the invention, the memories 112a and 112b may store instructions, parameters, of other information for implementing an EEN control policy.

The networking subsystems 114a and 114b may each comprise suitable logic, circuitry, interfaces, and/or code that may be operable to handle communication of information with other network devices via the backplane 104. In this regard, networking subsystems 108 may each comprise a media access controller (MAC) and a physical layer transceiver (PHY). Each of the networking subsystems 114a and 114b may be operable to implement Ethernet protocols, such as those in the IEEE 802.3 standards, for example. Notwithstanding, the invention is not limited in this regard.

The networking subsystems 114a and 114b may each be capable of operating at one or more standard rates such as 10 Mbps, 100 Mbps, 1 Gbps, 40 Gbps, 10 Gbps, and/or 100 Gbps (e.g., 10 GBASE-KX4 and/or 10 GBASE-KR); and/or non-standard rates such as 2.5 Gbps, 5 Gbps, 6 Gbps, and 20 Gbps. The networking subsystems 114a and 114b may each be operable to communicate over multiple channels and/or over a serial interface. The networking subsystems 114a and 114b may each comprise a pluggable module. Exemplary form factors for the pluggable modules may comprise SFP, SFP+, XENPAK, X2, XFP and XPAK modules. For example, the networking subsystems 114a and 114b may each support XFI and/or SFP+ direct attach copper. Also, the networking subsystems 114a and 114b may support transmission and/or reception at a high(er) data in one direction and transmission and/or reception at a low(er) data rate in the other direction.

In various embodiments of the invention, the networking subsystems 114a and 114b may be operable to perform forward error correction (FEC). Furthermore, one or more functions associated with implementing FEC may be configurable. For example, portions of an FEC module may be dynamically enabled and disabled.

In operation, the network devices 102a and 102b may communicate over one or more serial communication channels in the backplane 104 and the network devices 102a and 102b may be operable to implement LPI techniques in order conserve energy during periods when there is no data to communicate. In instances that forward error correction (FEC) is not implemented in the networking subsystems 114a and 114b, the network devices 102a and 102b may be operable to maintain and/or refresh synchronization and/or training parameters during LPI by exchanging low-complexity and/or low power physical layer signaling. In this regard, the physical signals may be sent and/or received without the need for complex signal processing and thus may reduce energy consumption. The physical layer signals may, for example, be generated and/or processed completely in OSI layer 1 without requiring OSI layer 2 functions. In instances that FEC is implemented in the network devices 102a and 102b, synchronization and/or training parameters may be refreshed during LPI by exchanging deterministic FEC blocks in addition to the low power and/or low complexity physical layer signaling. In this manner, synchronization based on deterministic FEC blocks may enable powering down and/or bypassing one or more FEC functions and thus reducing power consumption during LPI. In this regard, the deterministic FEC block may enable simplified processing as compared to a conventional FEC block. For example, the deterministic FEC block may comprise one or more predetermined values and/or sequences of bits and may be unscrambled. The deterministic FEC blocks may be sent as part of a wake-up sequence to re-synchronize FEC circuitry when the network devices 162a and 162b are transitioning out of low power idle.

In some embodiments of the invention, the total bandwidth of communication between the devices 102a and 102b may be increased by utilizing multiple serial communication channels. In this manner, the aggregate bandwidth between the devices 102a and 102b may be the data rate on each serial communication channel multiplied by the number of serial channels.

Figure 1B:
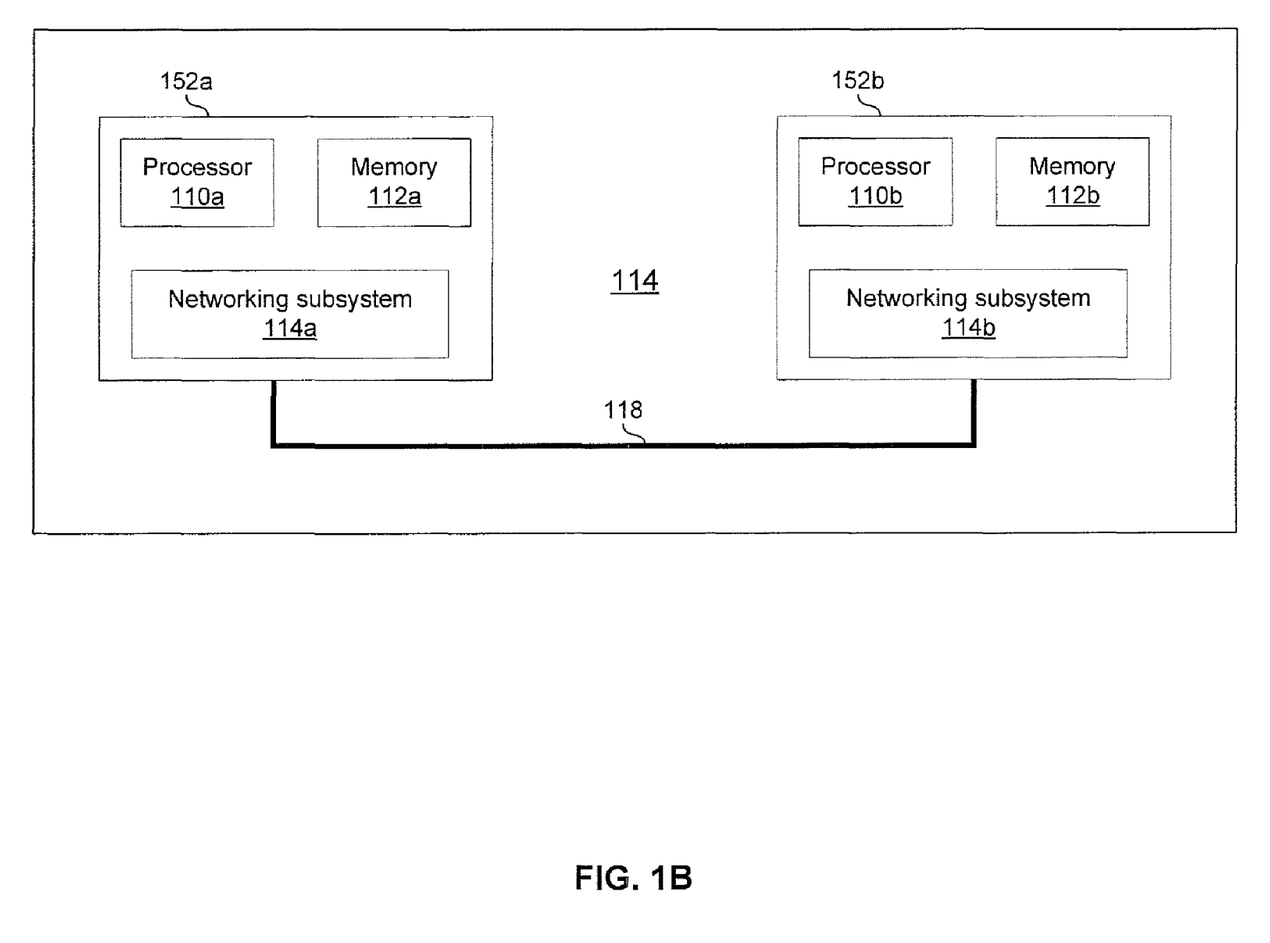
FIG. 1B is a block diagram depicting a pair of network devices operable to implement energy efficient techniques for chip-to-chip communications, in accordance with an embodiment of the invention.

FIG. 1B is a block diagram depicting a pair of network devices operable to implement energy efficient techniques for chip-to-chip communications, in accordance with an embodiment of the invention. Referring to FIG. 1B there is shown two networking devices 152a and 152b which may be functionally similar to or the same as the network devices 102a and 102b described with respect to FIG. 1A. Physically, the network devices 162a and 162b may each comprise a system-on-chip (SoC) or a chipset mounted on a circuit board 114. Each network device 152a and 152b may comprise a processor 110, a memory 112, and a network subsystem 114. The network devices 102 may communicate, over one or more copper traces 118. For example, the network devices 162 may each comprise an XFI interface for serial communications over a single trace 118.

In operation, the network devices 152a and 152b may be operable to implement LPI techniques in order conserve energy during periods when there is no data to communicate, or when communications may be held-off without critically impacting the timeliness of the data. In instances that FEC is not implemented in the devices 152a and 152b, the network devices 152a and 152b may be operable to maintain and/or refresh synchronization and/or training parameters during LPI mode by exchanging low-complexity and/or low power physical layer signaling. In this regard, the physical signals may be communicated—sent and/or received—without the need for complex signal processing and thus may reduce energy consumption. In instances that FEC is implemented in the network devices 152a and 152b, synchronization and/or training parameters may be maintained during low power idle by exchanging deterministic FEC blocks in addition to the low power and/or low complexity physical layer signaling. In this manner, the deterministic blocks may enable powering down and/or bypassing one or more FEC functions and thus reducing power consumption during low power idle. The deterministic FEC blocks may enable simplified processing as compared to a conventional FEC block. For example, the deterministic FEC block may comprise one or more predetermined values and/or sequences of bits and may be unscrambled. The deterministic FEC blocks may be sent as part of a wake-up sequence to re-synchronize FEC circuitry when the network devices 162a and 162b are transitioning out of low power idle.

In some embodiments of the invention, the total bandwidth of communication between the devices 152a and 152b may be increased by utilizing multiple serial communication channels. In this manner, the aggregate bandwidth between the devices 152a and 152b may be the data rate on each serial communication channel multiplied by the number of serial channels.

Figure 1C:
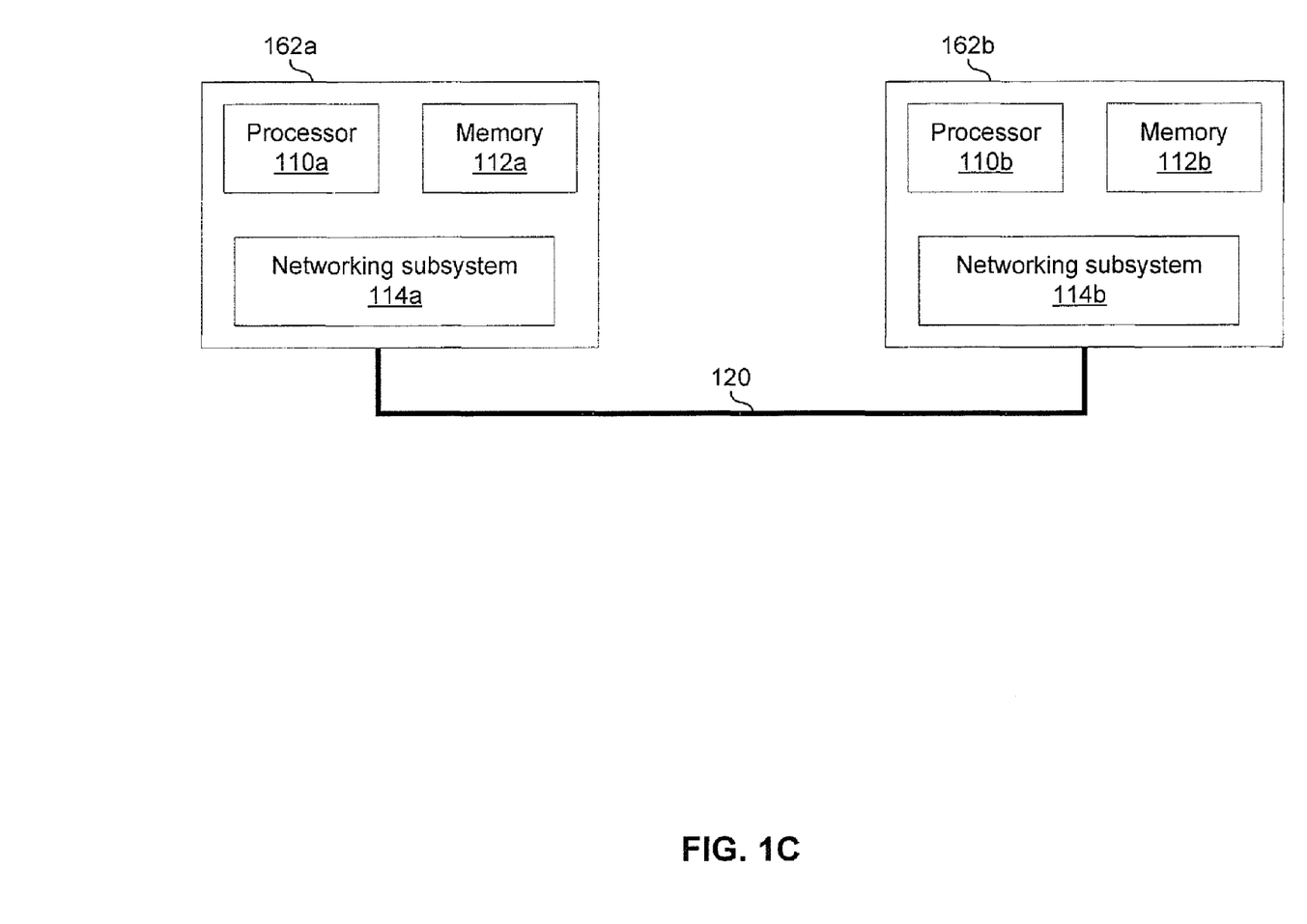
FIG. 1C is a block diagram depicting a pair of network devices operable to implement energy efficient techniques for box-to-box communications, in accordance with an embodiment of the invention.

FIG. 1C is a block diagram depicting a pair of network devices operable to implement energy efficient techniques for box-to-box communications, in accordance with an embodiment of the invention. Referring to FIG. 1C there is shown two networking devices 162a and 162b which may be functionally similar to or the same as the network devices 102a and 102b described with respect to FIG. 1A. Physically, the network devices 162a and 162b may each comprise a self-contained network device. That is, the devices 162a and 162b may be "box" level devices. For example, each of the network devices 162a and 162b may comprise, for example, a computer, a switch, or a router. Each network device 162a and 162b may comprise a processor 110, a memory 112, and a network subsystem 114.

The network devices 102 may communicate, over one or more cables. For example, the network devices 162 may communicate over a cable 120 that may comprise a copper or optical cable. Exemplary protocols which may be utilized by the devices 162a and 162b to communicate over the cable 120 may comprise 10 GBASE-R, 10 GBASE-X, 40 GBASE-X, 40 GBASE-R PCSes 100 G, 10 GBASE-CX, 10 GBASE-CR4, 100 GBASE-CR10, 10 GBASE-CR1. In some embodiments of the invention, the cable 120 may comprise direct attach copper cabling. In some embodiments of the invention, one or both of the networking subsystems 114a and 114b, or a portion of one or both of the networking subsystems 114a and 114b may comprise a pluggable transceiver. Exemplary form-factors of pluggable transceivers comprise SFP, SFP+, GBIC, and XENPAK.

In operation, the network devices 162a and 162b may be operable to implement LPI techniques in order conserve energy during periods when there is no data to communicate, or when communications may be held-off without critically impacting the timeliness of the data. In instances that FEC is not implemented in the devices 162a and 162b, the network devices 162a and 162b may be operable to maintain and/or refresh synchronization and/or training parameters during LPI mode by exchanging low-complexity and/or low power physical layer signaling. In this regard, the physical signals may be communicated—sent and/or received—without the need for complex signal processing and thus may reduce energy consumption. In instances that FEC is implemented in the network devices 162a and 162b, synchronization and/or training parameters may be maintained and/or refreshed during low power idle by exchanging the low power and/or low complexity physical layer signaling and FEC circuitry may be resynchronized by exchanging deterministic FEC blocks prior to transitioning out of LPI. In this manner, the deterministic blocks may enable powering down and/or bypassing one or more FEC functions and thus reducing power consumption during low power idle. The deterministic FEC blocks may enable simplified processing as compared to a conventional FEC block. For example, the deterministic FEC block may comprise one or more predetermined values and/or sequences of bits and may be unscrambled. The deterministic FEC blocks may be sent as part of a wake-up sequence to re-synchronize FEC circuitry when the network devices 162a and 162b are transitioning out of low power idle.

In some embodiments of the invention, the total bandwidth of communication between the devices 162a and 162b may be increased by utilizing multiple serial communication channels. In this manner, the aggregate bandwidth between the devices 162a and 162b may be the data rate on each serial communication channel multiplied by the number of serial channels.

Figure 2:
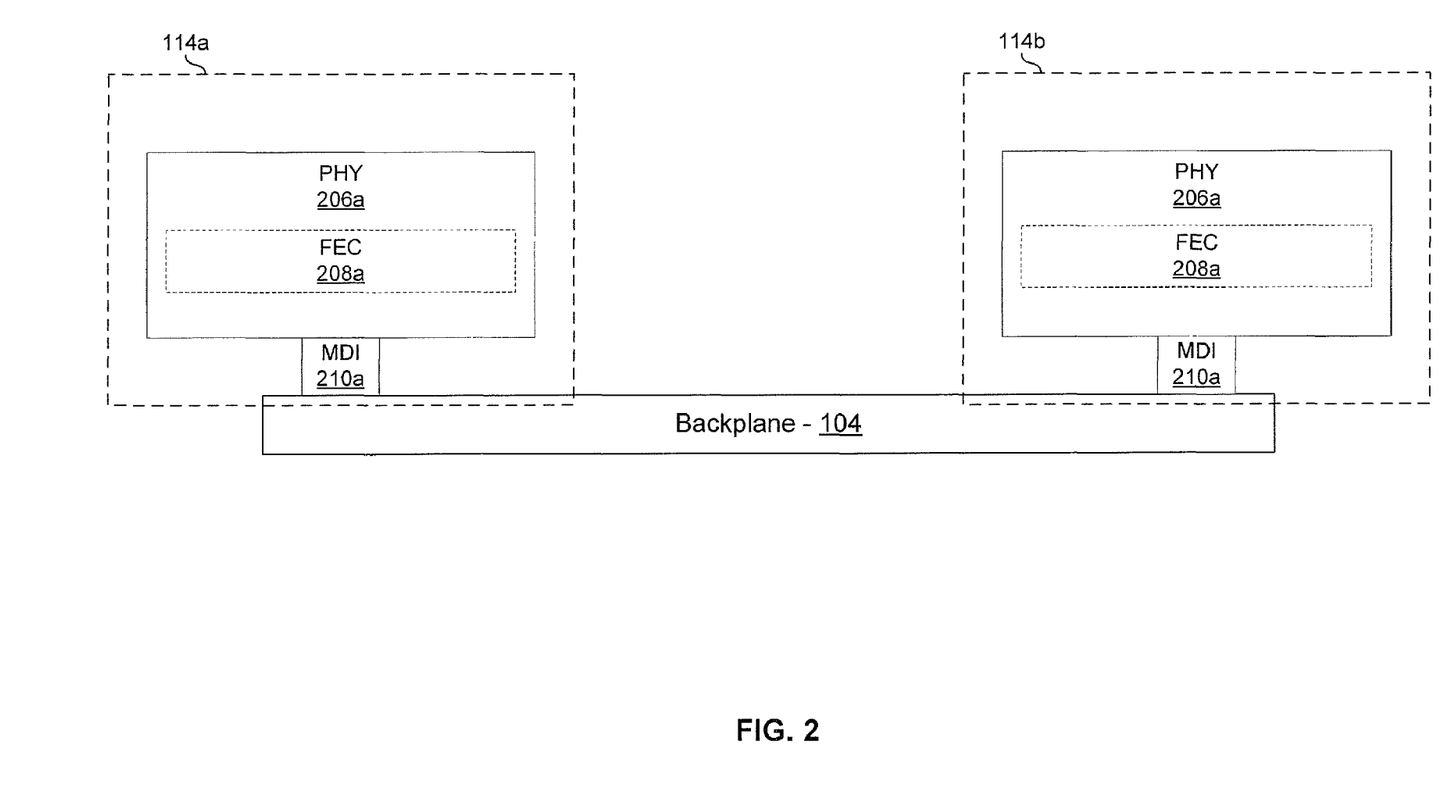
FIG. 2 is a block diagram depicting networking subsystems of two network devices operable to communicate over a serial communication channel, in accordance with an embodiment of the invention.

FIG. 2 is a block diagram depicting networking subsystems of two network devices operable to communicate over a serial communication channel, in accordance with an embodiment of the invention. Referring to FIG. 2 there is shown portions of the networking subsystems 114a and 114b described with respect to FIG. 1A. In this regard, a PHY portion 206 and media dependent linterface (MDI) 210 of each networking subsystem 114 is depicted. Each of the PHYs 206 may comprise a forward error correction (FEC) module 208.

The FEC module 208 may comprise suitable logic, circuitry, interfaces, and/or code that may be operable to implement one or more FEC functions. In this regard, the FEC functions implemented by the FEC module 208 may comprise FEC block generation, FEC encoder functions, reverse gearbox functions, FEC decoder functions, and FEC block synchronization functions described in IEEE 802.3ap clause 74.

In operation, networking subsystems 114 may be operable to implement LPI techniques in order conserve energy during periods when there is not data to communicate. In instances that the FEC modules 208 are disabled or not instantiated in the networking subsystems 114, the networking subsystems 114 may be operable to maintain and/or refresh synchronization and/or training parameters during LPI mode by exchanging low-complexity and/or low power physical layer signaling. In this regard, the physical signals may be sent and/or received without the need for complex signal processing and thus may reduce energy consumption. In instances that the FEC modules 208 are instantiated and enabled in the networking subsystems modules 114, synchronization and/or training parameters may be maintained during LPI mode by exchanging the physical layer signaling and circuitry associated with implementing FEC functions may be re-synchronized prior to transitioning out of LPI by exchanging deterministic FEC blocks. In this manner, the deterministic blocks may enable powering down and/or bypassing of one or more of the FEC functions. This may result in, for example, a reduction in power consumption during LPI mode.

Figure 3A:
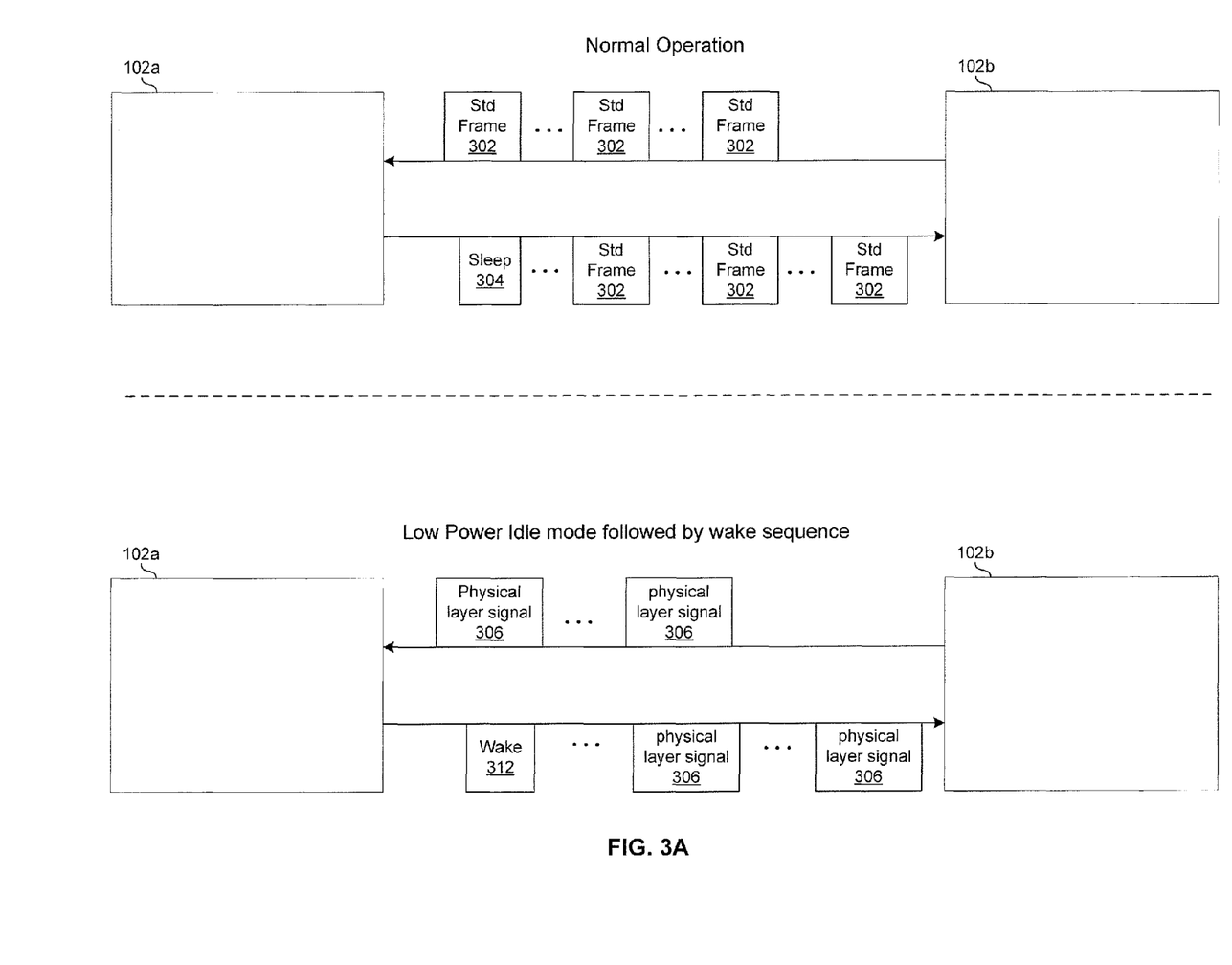
FIG. 3A is a diagram illustrating the utilization of low power physical layer signaling to maintain and/or refresh training parameters during low power idle mode in non-FEC-enabled network devices that communicate over a serial communication channel, in accordance with an embodiment of the invention.

FIG. 3A is a diagram illustrating the utilization of low power physical layer signaling to maintain training parameters during low power idle mode in non-FEC-enabled network devices that communicate over a serial communication channel, in accordance with an embodiment of the invention. The top half of FIG. 3A shows the network devices 102 exchanging standard frames 302 over a serial communication channel until the network device 102a transmits a sleep signal 304. After the sleep signal 304 is received and processed by the network device 102b, the network devices 102 may transition to a LPI mode of operation, as shown in the lower half of FIG. 3A. During the low power idle mode depicted in the lower half of FIG. 3A, the network devices 102 may exchange low complexity and/or low power physical layer signals 306 to maintain synchronization and/or training parameters until a wake signal 312 transmitted by the network device 312 is received and processed by the network device 102b. When the wake signal 312 is received and processed the network devices 102 may begin a wake sequence and may transition out of low power idle.

Figure 3B:
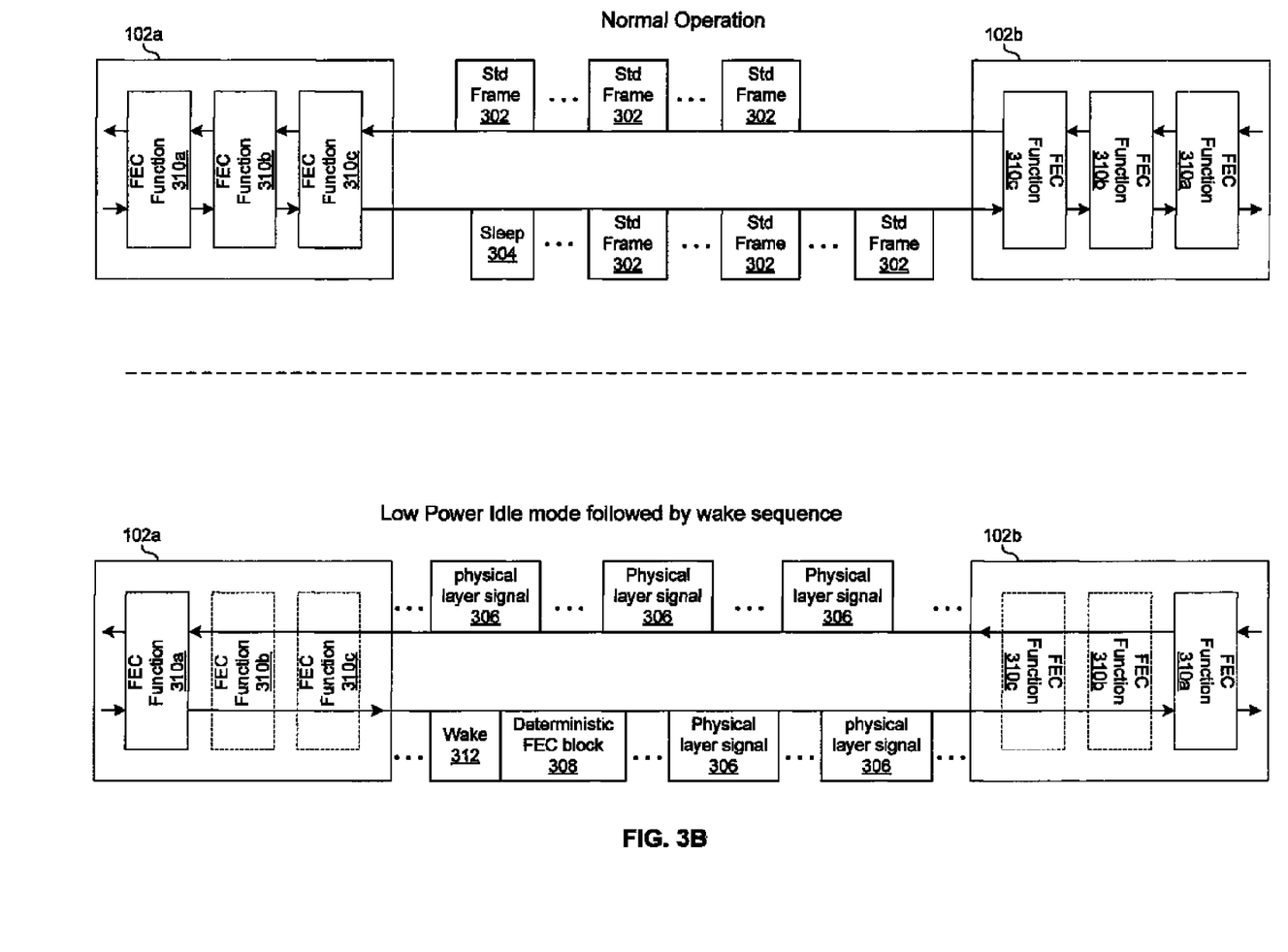
FIG. 3B is a diagram illustrating exchange of deterministic FEC blocks to synchronize FEC functions prior to exiting low power idle, in accordance with an embodiment of the invention

FIG. 3B is a diagram illustrating exchange of deterministic FEC blocks to synchronize FEC functions prior to exiting low power idle, in accordance with an embodiment of the invention. The top half of FIG. 3B shows the network devices 102 exchanging standard frames 302 over a serial communication channel until the network device 102a transmits a sleep signal 304. While operating in the normal mode of operation depicted in the top half of FIG. 3B, the network devices 102 may be operable to implement full FEC functionality. In this regard, for illustration, the FEC functionality is depicted as three functions—FEC function 310a, 310b, and 310c—and each of the functions 310a-310c may be operational while configured in the normal mode of operation. The functions 310c may comprise, for example, a gearbox or reverse gearbox function. The functions 310b may comprise, for example, a scrambling and/or unscrambling functions. The function 310c may comprise, for example, an encoding and/or decoding function.

After the sleep signal 304 is received and processed by the network device 102b, the network devices 102 may transition to a low power idle mode of operation, as shown in the lower half of FIG. 3B. During the low power idle operation, aspects of the invention may enable reduced energy consumption. In this regard, low power and/or low complexity physical layer signals 306 may be exchanged to maintain and/or refresh synchronization and/or training parameters in the network devices 102 until one or both of the network devices 102 initiates a wake sequence. In the embodiment of the invention depicted, the network device 312 may begin the wake sequence by transmitting a wake signal 312 and deterministic FEC block 308. The deterministic FEC block 308 may synchronize FEC functions in the two network devices 102 and the wake signal may trigger the device 102b to transition out of low power idle. In various embodiments of the invention, the wake signal 312 may be send before or after the deterministic FEC block 308. The network device 102b may respond by transmitting a deterministic FEC block 308b. In this regard, full FEC functionality may not be required to process the deterministic FEC blocks 306 and thus one or more of the FEC functions 310 may be disabled and/or powered down while the network devices 102 are operating in an energy saving mode such as low power idle. For example, FEC functions comprising scrambling, unscrambling, encoding, and/or decoding may be disabled while the network devices 102 are operating in an energy saving mode.

Figure 4:
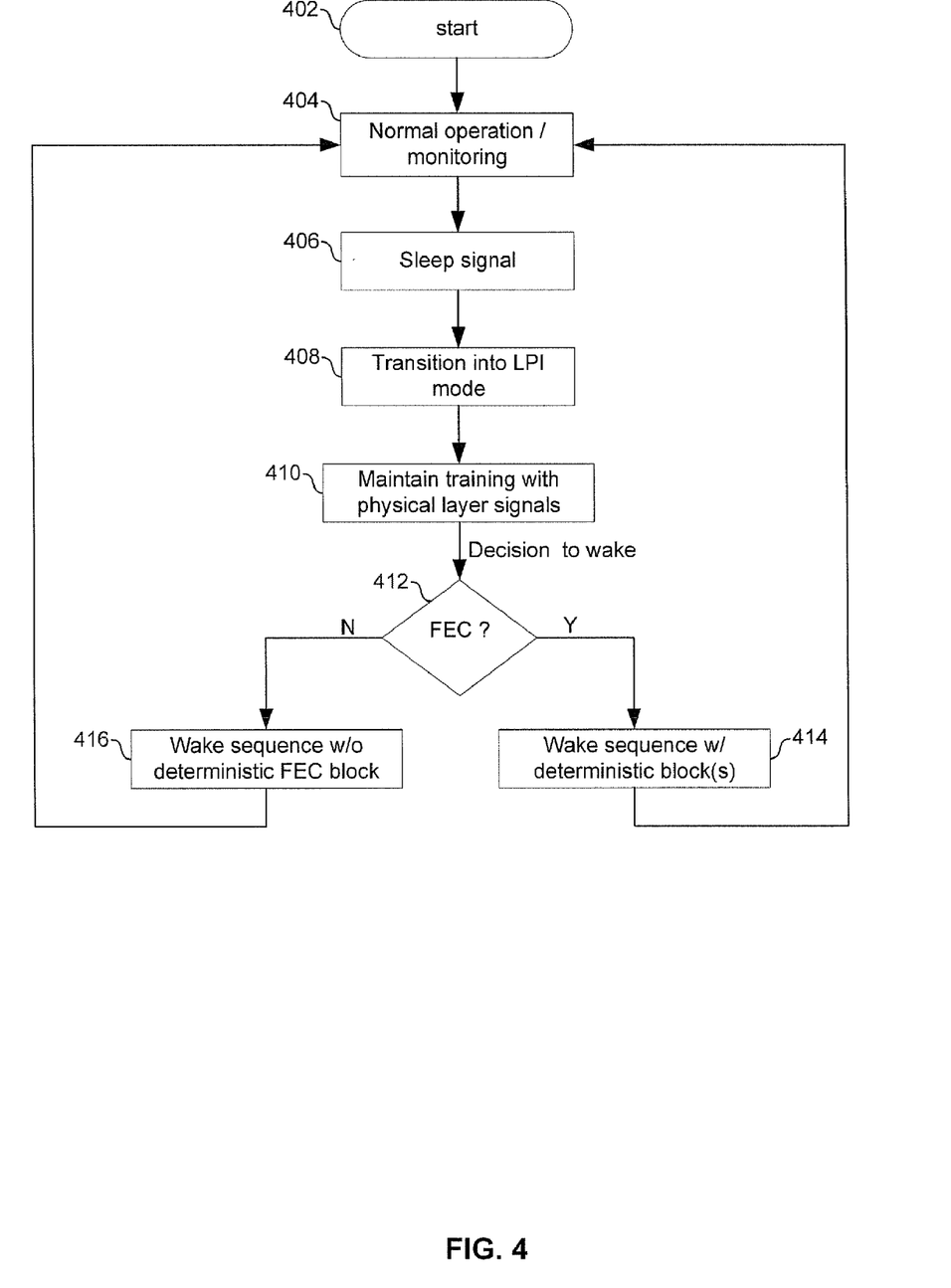
FIG. 4 is a flow chart illustrating exemplary steps for energy efficient communications over a serial communication channel, in accordance with an embodiment of the invention.

FIG. 4 is a flow chart illustrating exemplary steps for energy efficient communications over a serial communication channel, in accordance with an embodiment of the invention. The exemplary steps of FIG. 4 may be implemented by a networking device such as the devices 102 described with respect to FIGS. 1A, 1B, and 2. The exemplary steps may begin with step 402. After start step 402, the exemplary steps may advance to step 404 in which the networking devices 102 may enter a normal mode of operation. While in the normal mode of operation, the network devices 102 may exchange Ethernet frames over one or more serial communication channels and, during periods of inactivity, exchange conventional IDLE symbols. Subsequent to step 404, the exemplary steps may advance to step 406.

In step 406, a sleep signal may be transmitted from a first of the network devices 102 and subsequently received and processed by a second of the network devices 102. Subsequent to step 406, the exemplary steps may advance to step 408.

In step 408, subsequent to the exchange of the sleep signal, the network devices 102 may transition into a low power idle mode. Subsequent to step 408, the exemplary steps may advance to step 410.

In step 410, the network devices 102 may exchange physical layer signals 306 to refresh and/or maintain training and/or synchronization. For example, coefficients for echo and/or crosstalk cancellers may be kept current. Subsequently, perhaps based on a timer or occurrence of another event, one of the network devices 102 may decide to transition out of low power idle. Upon a network device 102 deciding to wake from LPI, the exemplary steps may advance to step 412.

In step 412, it may be determined whether FEC is enabled and/or utilized for communications between the network devices 102. In instances that FEC is not utilized for communications between the network devices 102, the exemplary steps may advance to step 416.

In step 416, the network device 102 deciding to wake up, may transmit a wake sequence to the other network device 102. In an exemplary embodiment of the invention, the wake sequence in step 416 may comprise a wake signal 312 which may be similar to the signals 306. For example, the wake signal 312 may comprise a plurality of the signals 306 in a particular sequence to distinguish the wake signal 312 from the signals 306.

Returning to step 412, in instances that FEC is utilized for communications between the network devices 102, the exemplary steps may advance to step 414.

In step 414, the network device 102 deciding to wake up, may transmit a wake sequence to the other network device 102. In an exemplary embodiment of the invention, the wake sequence in step 414 may comprise a wake signal 312 which may be similar to the signals 306, and a deterministic FEC block 308. Full FEC functionality may not be required for generating, receiving, or processing the deterministic FEC block 308 and thus FEC functions may be re-synchronized with less power consumption than in conventional systems. Upon re-synchronizing the FEC functions and waking up from low power idle, the exemplary steps may return to the previously described step 404.

In various embodiments of the invention, one or more circuits in an Ethernet PHY 206 that communicates over one or more serial communication channels may transmit and/or receive physical layer signals 306 over the serial communication channel(s) to maintain and/or refresh synchronization and/or training parameters while operating in an energy saving mode. The Ethernet PHY 206 may transition out of the energy saving mode upon transmitting and/or receiving a wake sequence via the one or more serial communication channels, where the wake sequence comprises one or more deterministic forward error correction (FEC) blocks 308 in instances that FEC is utilized for communications via the serial communication channel(s). The one or more circuits in the Ethernet PHY 206 may be operable to perform forward error correction (FEC) functions and one or more of the FEC functions 310 may be disabled while remaining ones of the FEC functions 310 are enabled. One or more deterministic FEC blocks 312 may be processed via the enabled remaining ones of the FEC functions 310. Synchronization with a corresponding link partner may be maintained and/or refreshed based on the processing of the deterministic FEC block(s) 312. The one or more circuits may be configured based on an energy efficient networking control policy. The energy saving mode may comprise a low power idle mode. One or more FEC functions 310 may be disabled upon receiving a sleep signal 304 from a link partner that communicates with the Ethernet PHY 206. One or more FEC functions 310 may be enabled upon receiving a wake sequence. The serial communication channel(s) may comprise backplane, inter-chip connections, or copper cabling. One or more deterministic FEC blocks 312 may be communicated while the Ethernet PHY 206 is operating in a low power idle mode. FEC functions 310 that may be disabled may comprise encoding and/or decoding functions. FEC functions 310 that may be disabled may comprise one or both of scrambling and unscrambling functions. The Ethernet PHY 206 may be integrated on a line card.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for energy efficient networking over a serial communication channel.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for networking, the method comprising:
performing, by one or more circuits in an Ethernet physical layer device (PHY) that communicates over one or more serial communication channels:
prior to transitioning to an energy saving mode, receiving data with forward error correction (FEC) information of a first type, wherein a content of said first type of FEC information is based on a content of said data;
receiving physical layer signals over said one or more serial communication channels to maintain and/or refresh synchronization and/or training parameters in said Ethernet PHY while operating in said energy saving mode;
transitioning out of said energy saving mode upon receiving a wake sequence via said one or more serial communication channels, said wake sequence including FEC information of a second deterministic type, said second deterministic type of FEC information having a predetermined value and/or sequence of bits; and processing said second deterministic type FEC information with a first part of FEC functionality in said Ethernet PHY that is enabled, while a second part of FEC functionality in said Ethernet PHY is disabled.

2. The method according to claim 1, comprising configuring said one or more circuits based on an energy efficient networking control policy.

3. The method according to claim 1, comprising disabling said second part of EFC functionality after receiving a sleep signal from a link partner that communicates with said Ethernet PHY.

4. The method according to claim 1, wherein said energy saving mode comprises a low power idle mode.

5. The method according to claim 1, comprising re-enabling said second part of FEC functionality after receiving said wake sequence.

6. The method according to claim 1, wherein said one or more serial communication channels each comprise backplane, inter-chip traces, and/or copper cabling.

7. The method according to claim 1, wherein said disabled second part of FEC is functionality comprise encoding and/or decoding functionality.

8. The method according to claim 1, wherein said disabled second part of FEC functionality comprises one or both of scrambling and unscrambling functions.

9. The method according to claim 1, wherein said Ethernet PHY is integrated on a line card.

10. A system for networking, the system comprising:
one or more circuits in an Ethernet physical layer device (PHY) that communicates over one or more serial communication channels, wherein said one or more circuits:
perform forward error correction (FEC) functions;
receive physical layer signals over said one or more serial communication channels to maintain and/or refresh synchronization and/or training parameters in said Ethernet PHY while operating in an energy saving mode;
transition out of said energy saving mode upon receiving a wake sequence via said one or more serial communication channels, said wake sequence including one or more deterministic FEC blocks, each of said one or more deterministic FEC blocks having a predetermined value and/or sequence of bits; and
process said one or more deterministic FEC blocks with a first part of FEC functionality in said Ethernet PHY that is enabled, while a second part of FEC functionality in said Ethernet PHY is disabled.

11. The system according to claim 10, wherein said one or more circuits are configured based on an energy efficient networking control policy.

12. The system according to claim 10, wherein said one or more circuits disable said second part of FEC functionality after receiving a sleep signal from a link partner that communicates with said Ethernet PHY.

13. The system according to claim 10, wherein said energy saving mode comprises a low power idle mode.

14. The system according to claim 10, wherein said one or more circuits re-enable said second part FEC functionality after receiving said wake sequence.

15. The system according to claim 10, wherein said one or more serial communication channels each comprise backplane, inter-chip traces, and/or copper cabling.

16. The system according to claim 10, wherein said disabled second part of FEC functionality comprise encoding and/or decoding functions.

17. The system according to claim 10, wherein said disabled second part of FEC functionality comprise one or both of scrambling and unscrambling functions.

18. The system according to claim 10, wherein said Ethernet PHY is integrated on a line card.

19. A method, comprising:
prior to transitioning of a physical layer device to an energy saving mode, receiving data with forward error correction (FEC) information of a first type, wherein a content of said first type of FEC information is based on a content of said data;
receiving refresh signals to maintain and/or refresh synchronization in said physical layer device while operating in said energy saving mode;
transitioning said physical layer device out of said energy saving mode upon receiving a wake sequence, said wake sequence including FEC information of a second deterministic type, said second deterministic type of FEC information having a predetermined value and/or sequence of bits; and
processing said second deterministic type of FEC information with a first part of FEC functionality in said physical layer device that is enabled, while a second part of FEC functionality in said physical layer is disabled.

20. The method according to claim 19, further comprising disabling said second part of FEC functionality after receiving a sleep signal from a link partner that communicates with said physical layer device.

21. The method according to claim 19, further comprising re-enabling said second part of FEC functionality after receiving said wake sequence.

* * * * *

UNITED STATES PATENT AND TRADEMARK OFFICE
CERTIFICATE OF CORRECTION

PATENT NO. : 8,230,240 B2  
APPLICATION NO. : 12/495530  
DATED : July 24, 2012  
INVENTOR(S) : Diab et al.

Page 1 of 1

It is certified that error appears in the above-identified patent and that said Letters Patent is hereby corrected as shown below:

Col. 11, line 12, replace "EFC" with --FEC--.

Col. 11, line 24, delete "is".

Signed and Sealed this  
Eleventh Day of September, 2012

David J. Kappos  
*Director of the United States Patent and Trademark Office*